(12) United States Patent
Sasaki et al.

(10) Patent No.: US 11,122,171 B2
(45) Date of Patent: Sep. 14, 2021

(54) DISPLAY APPARATUS

(71) Applicant: FUJIFILM Business Innovation Corp., Tokyo (JP)

(72) Inventors: Hirotake Sasaki, Kanagawa (JP); Kentaro Takano, Kanagawa (JP); Daisuke Yasuoka, Kanagawa (JP); Keigo Hattori, Kanagawa (JP); Mitsuo Hayashi, Kanagawa (JP); Hiroki Terabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 131 days.

(21) Appl. No.: 16/203,644

(22) Filed: Nov. 29, 2018

(65) Prior Publication Data

US 2019/0174016 A1 Jun. 6, 2019

(30) Foreign Application Priority Data

Dec. 6, 2017 (JP) .............................. JP2017-233940

(51) Int. Cl.
*H04N 1/00* (2006.01)
*G06K 9/46* (2006.01)
*G02B 27/01* (2006.01)
*G06K 9/00* (2006.01)

(52) U.S. Cl.
CPC ..... *H04N 1/00352* (2013.01); *G02B 27/0172* (2013.01); *G06K 9/00469* (2013.01); *G06K 9/4604* (2013.01); *H04N 1/00331* (2013.01)

(58) Field of Classification Search
CPC combination set(s) only.
See application file for complete search history.

(56) References Cited

U.S. PATENT DOCUMENTS

| 6,762,775 B2* | 7/2004 | Ho ..................... G06F 3/03547 715/701 |
| 6,952,279 B1* | 10/2005 | Iida ..................... H04N 1/00209 358/1.15 |
| 2005/0008256 A1* | 1/2005 | Uchiyama ................. G06T 7/73 382/291 |
| 2009/0234882 A1* | 9/2009 | Ota ........................ G06F 16/50 |
| 2012/0023399 A1* | 1/2012 | Hoshino ............... G06F 40/211 715/256 |
| 2013/0106809 A1* | 5/2013 | Ohsaki .................. G06F 3/0346 345/204 |

(Continued)

FOREIGN PATENT DOCUMENTS

| JP | 2010005864 | 1/2010 |
| JP | 2014172710 | 9/2014 |

(Continued)

*Primary Examiner* — Negussie Worku
(74) *Attorney, Agent, or Firm* — JCIPRNET

(57) ABSTRACT

A display apparatus includes an acquisition section, a specification section, and a display controller. The acquisition section acquires page information indicative of a page of a reference destination of a book. The specification section specifies a location, which corresponds to the acquired page information, on a fore edge of the book. The display controller performs control such that an image indicative of the specified location on the fore edge is superimposedly displayed on the fore edge which is seen through a display provided in the display apparatus that is mounted on a user.

20 Claims, 9 Drawing Sheets

(56) References Cited

U.S. PATENT DOCUMENTS

| | | | | |
|---|---|---|---|---|
| 2013/0168954 A1* | 7/2013 | Koren | ................ | G06K 9/00483 |
| | | | | 281/15.1 |
| 2016/0011728 A1 | 1/2016 | Fujimoto | | |
| 2016/0080597 A1* | 3/2016 | Hasegawa | ............ | H04N 1/3876 |
| | | | | 358/1.2 |
| 2017/0263263 A1* | 9/2017 | Kovesi | .................... | G10L 25/21 |
| 2019/0161000 A1* | 5/2019 | Sikkens | ................ | F21S 41/153 |
| 2020/0042146 A1* | 2/2020 | Chen | .................. | G06F 15/0291 |
| 2020/0402265 A1* | 12/2020 | Nakata | ................ | A63F 13/5255 |

FOREIGN PATENT DOCUMENTS

| | | |
|---|---|---|
| JP | 2015111392 | 6/2015 |
| JP | 2015184889 | 10/2015 |

\* cited by examiner

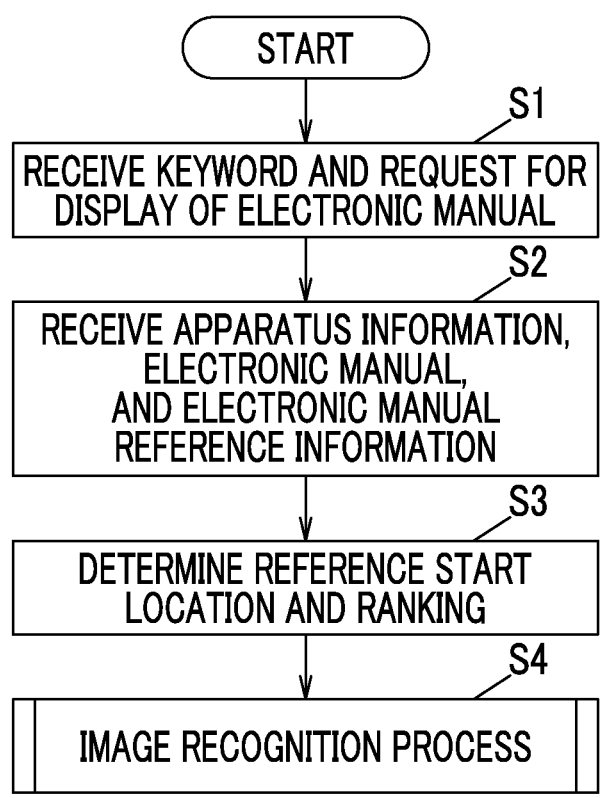

FIG. 9
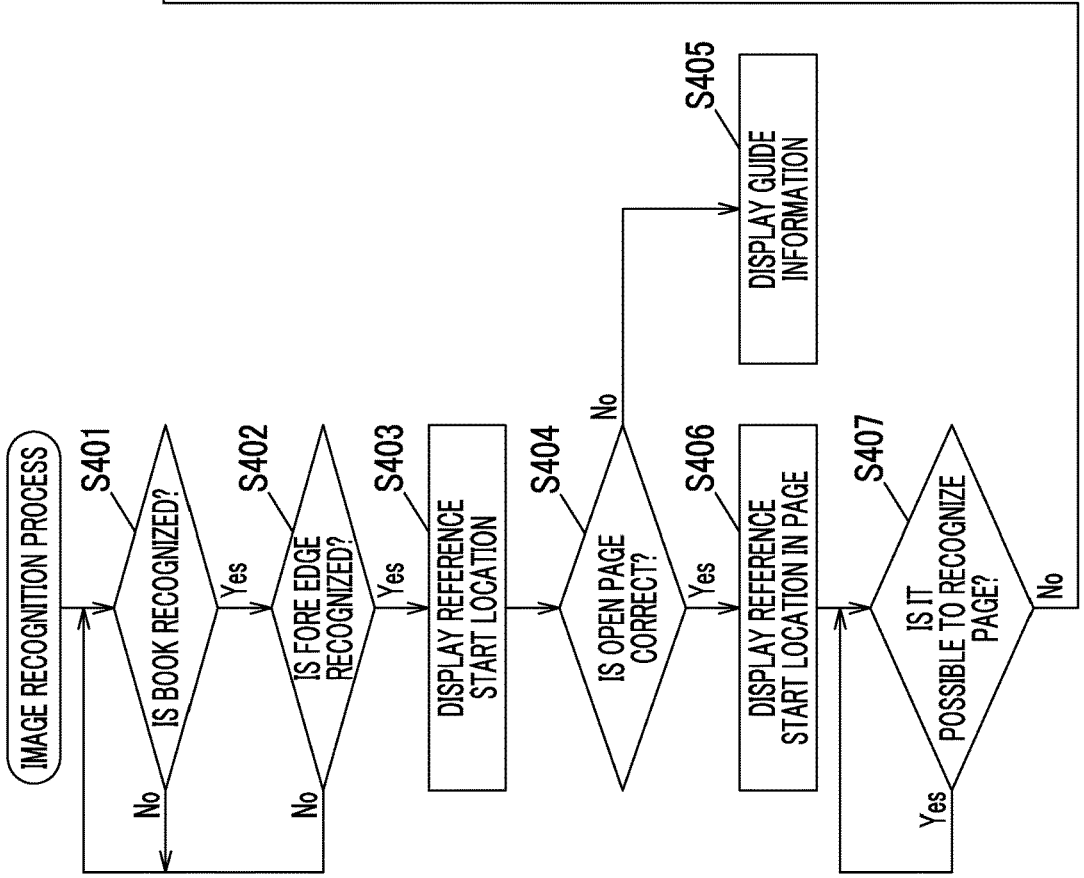
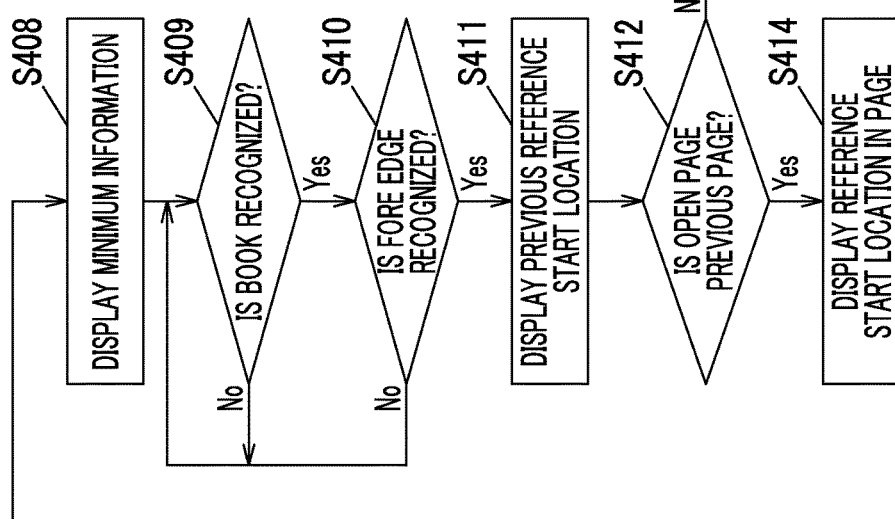

DISPLAY APPARATUS

CROSS-REFERENCE TO RELATED APPLICATIONS

This application is based on and claims priority under 35 USC 119 from Japanese Patent Application No. 2017-233940 filed Dec. 6, 2017.

BACKGROUND

Technical Field

The present invention relates to a display apparatus.

SUMMARY

According to an aspect of the invention, there is provided a display apparatus including: an acquisition section that acquires page information indicative of a page of a reference destination of a book; a specification section that specifies a location, which corresponds to the acquired page information, on a fore edge of the book; and a display controller that performs control such that an image indicative of the specified location on the fore edge is superimposedly displayed on the fore edge which is seen through a display provided in the display apparatus that is mounted on a user.

BRIEF DESCRIPTION OF THE DRAWINGS

Exemplary embodiment(s) of the present invention will be described in detail based on the following figures, wherein:

FIG. 8 is a flowchart illustrating an example of an operation of the HMD apparatus; and FIG. 9 is a flowchart illustrating an example of an image recognition process in FIG. 8.

DETAILED DESCRIPTION

Hereinafter, an exemplary embodiment of the present invention will be described in detail with reference to the accompanying drawings. Meanwhile, the same reference symbols are attached to components which have substantially the same functions in respective drawings, and the description thereof will not be repeated.

Summary of Exemplary Embodiment

A display apparatus according the exemplary embodiment of the present invention includes an acquisition section that acquires page information indicative of a page of a reference destination of a book, a specification section that specifies a location, which corresponds to the acquired page information, on a fore edge of the book, and a display controller that performs control such that an image indicative of the specified location on the fore edge is superimposedly displayed on the fore edge which is seen through a display provided in the display apparatus that is mounted on a user.

The "book" is referred to by the user and is acquired by binding something that is written and something that is printed. The user includes, for example, a user of another apparatus, a manager, a service man, and the like. Another apparatus includes an apparatus other than the display apparatus, that is, an image forming apparatus, an image processing apparatus, an information processing apparatus, or the like.

The "page of the reference destination" indicates, for example, a page which is recommended for reference in response to an operation intended by the user. The operation includes various operations such as setting, input, selection, edit, replacement of expendables, and the like. For example, the page of the reference destination corresponds to a page corresponding to an operation for recovering a process in a case where another apparatus stops the process, a page corresponding to an operation for continuing a setting operation in a case where the user extracts the book while the setting operation is being performed, a page corresponding to an operation for replacing the expendables in a case where display which notifies an expendable replacement time is performed, and the like.

Exemplary Embodiment

Figure 1:
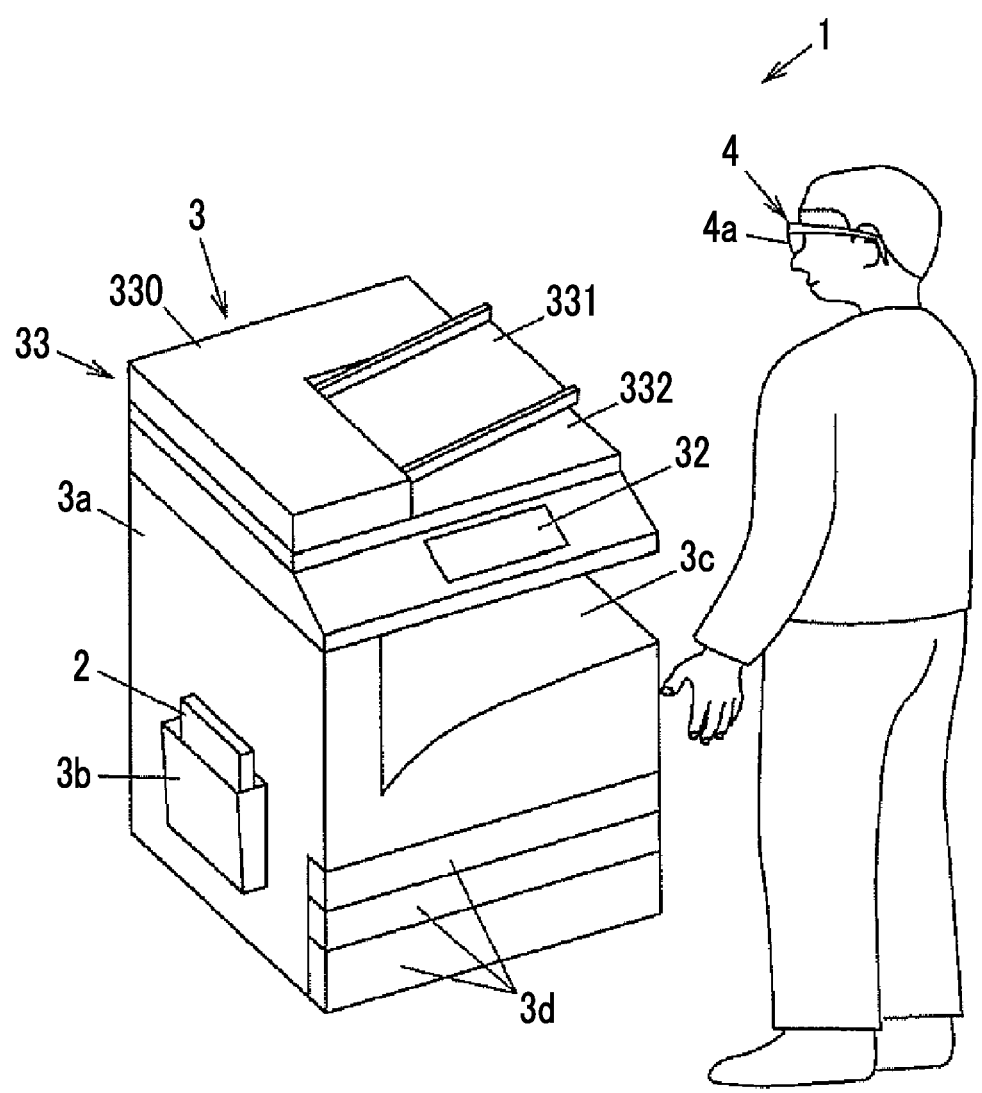
FIG. 1 is a perspective diagram illustrating an example of a configuration of a display system according to an exemplary embodiment of the present invention.

FIG. 1 is a perspective diagram illustrating an example of a configuration of a display system according to the exemplary embodiment of the present invention.

A display system 1 includes an image forming apparatus 3 provided with a book 2 and a head mounted display apparatus (hereinafter, referred to as an "HMD apparatus") 4 which is mounted on a head of the user. The image forming apparatus 3 is an example of another apparatus. The HMD apparatus 4 is an example of the display apparatus.

The image forming apparatus 3 and the HMD apparatus 4 may be connected to each other wirelessly. Meanwhile, the image forming apparatus 3 and the HMD apparatus 4 may be connected in a wired manner.

The book 2 is a manual which is referred to by the user and is relevant to the image forming apparatus 3. The manual has, for example, a spread format. The user includes, for example, a user of the image forming apparatus 3, a manager, a service man, and the like. The manual includes an operation manual (also referred to as an "instruction manual") which is mostly referred to by the user or the manager, a service manual which is referred to by a major service man, and the like. The operation manual is written with a list, a method for operating the image forming apparatus 3, explanation of terms, an error code, a cause of an error, an error coping method, and the like. The service manual is written with the list, a method for replacing the components, a method for checking the components, a method for decomposing the components, a replacement component list, and the like. In addition, the manual is written with illustrations and the like in addition to text.

The image forming apparatus 3 is, for example, a multi-function printer which has plural functions such as a copying function, a scan function, and a print function. The image forming apparatus 3 includes an apparatus main body 3a, an accommodation unit 3b which is provided on a side surface of the apparatus main body 3a and which accommodates the book 2 such that the book 2 may be taken out, a paper discharge stand 3c through which printed paper is discharged, an operation display 32 which receives the operation performed by the user and which displays information, and an image reading unit 33 which reads an image from a document. Meanwhile, the book 2 may not be accommodated in the accommodation unit 3b of the image forming apparatus 3, and, for example, may be accommodated in a cabinet or the like.

The image reading unit 33 includes an automatic paper feeding device 330 which feeds the document to a document stand. The automatic paper feeding device 330 includes a document tray 331 on which the document is disposed, and a document discharge stand 332 through which the document is discharged.

The HMD apparatus 4 displays an image in virtual space (referred to as a virtual image or a false image) to be superimposed on real space, that is, virtually displays the virtual image. Specifically, the HMD apparatus 4 is mounted on the head of the user and is a light transmission-type head mounted display apparatus which, in a case where the user visually recognizes the virtual image, enables the visual image to be visually recognized directly in the real space (also referred to as an outside view) at the same time. The light transmission-type head mounted display apparatus may be, for example, glasses or goggles.

Configuration of Image Forming Apparatus

Figure 2:
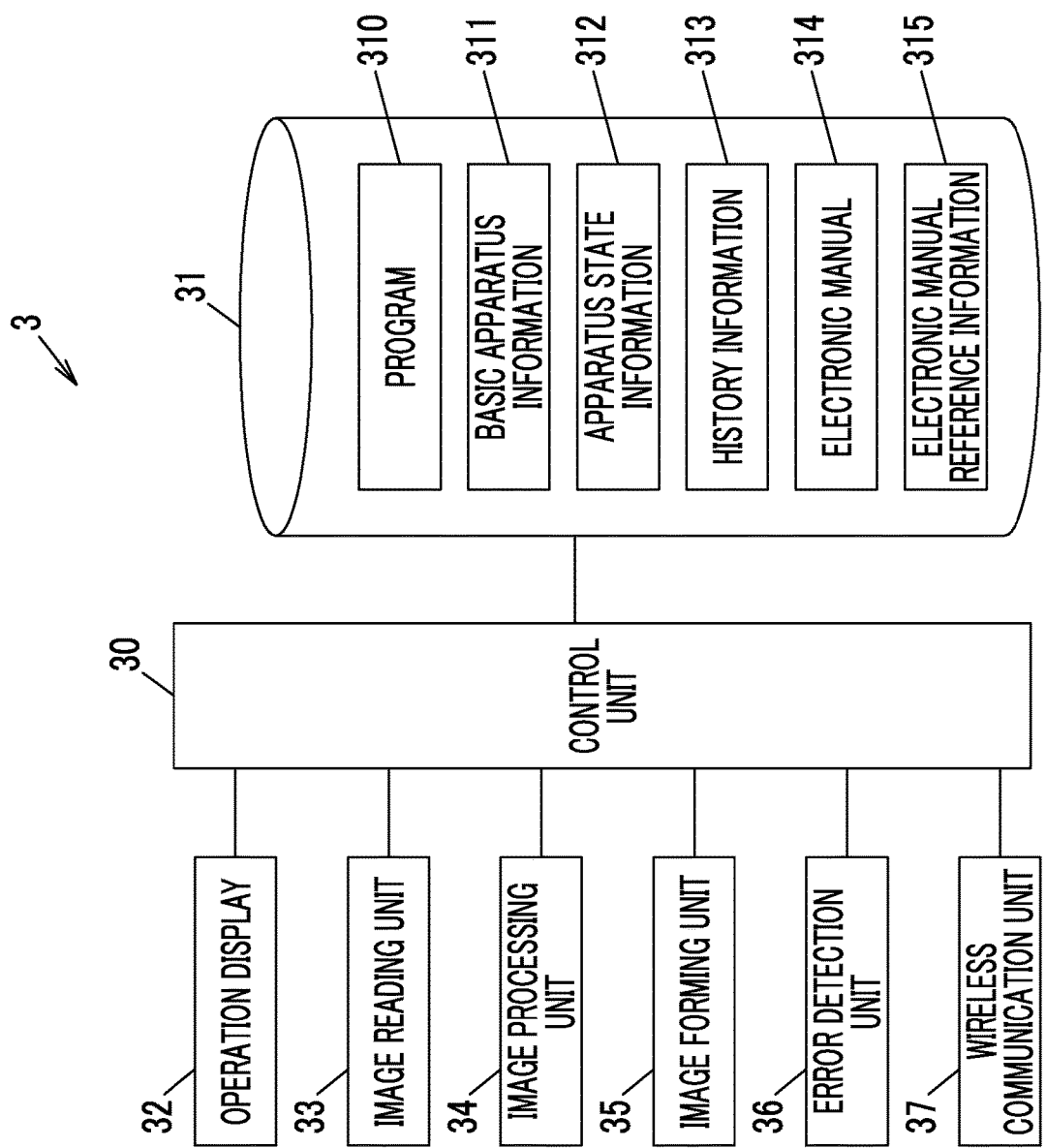
FIG. 2 is a block diagram illustrating an example of a control system of an image forming apparatus.

FIG. 2 is a block diagram illustrating an example of a control system of the image forming apparatus 3. The image forming apparatus 3 includes a control unit 30 which controls respective units of the image forming apparatus 3, a memory 31 which stores various pieces of information, an operation display 32, an image reading unit 33, an image processing unit 34, an image forming unit 35, an error detection unit 36, and a wireless communication unit 37.

The control unit 30 is realized by a CPU, an interface, and the like, operates according to a program 310, and controls the respective units of the image forming apparatus 3.

The memory 31 includes a Read Only Memory (ROM), a Random Access Memory (RAM), a hard disk, and the like, and stores the program 310, basic apparatus information 311, apparatus state information 312, history information 313, an electronic manual 314, electronic manual reference information 315, and the like.

The basic apparatus information 311 includes a model of the image forming apparatus 3, current date and time, and the like. The apparatus state information 312 includes an operational situation, states of various switches, optional information, content displayed by the operation display 32, an error code used in a case where an error is generated, and the like. The history information 313 includes operation history, failure history, component replacement history, a frequency in use, the number of accumulated copied sheets, information (user ID) of the user who uses the image forming apparatus 3, and the like.

The electronic manual 314 is an electronic document corresponding to the book 2 and is common to, for example, plural models. Meanwhile, the electronic manual 314 may be different for each model.

In the electronic manual reference information 315, a referred page of the electronic manual 314, an item number, a title, a keyword, and the number of times are recorded for each user ID.

The operation display 32 includes, for example, a touch panel display in which a touch panel is polymerized and disposed on a display such as a liquid crystal display.

The image reading unit 33 includes, for example, the automatic paper feeding device 330 and a scanner, and reads a document which is fed from the automatic paper feeding device 330 or image data from the document which is disposed on the document stand. The image processing unit 34 performs image processing such as image compression, extension, and synthesis. The image forming unit 35 forms an image on a recording medium, such as paper, using, for example, an electronic picture method, an ink jet method, or the like, and outputs the image to the paper discharge stand 3c.

The error detection unit 36 detects the error which is generated while the image forming apparatus 3 is performing the process. The control unit 30 transmits the error code corresponding to the error detected by the error detection unit 36 to the HMD apparatus 4. In addition, in a case where the process stopped in the image forming apparatus 3 restarts, the control unit 30 transmits information, which indicates that the process stopped in the image forming apparatus 3 restarts, to the HMD apparatus 4. The error code is an example of error information.

The wireless communication unit 37 communicates with the HMD apparatus 4 using, for example, a wireless Local Area Network (LAN) such as Wireless Fidelity (Wi-Fi) or Wi-Fi direct, or short-range wireless communication such as Bluetooth (registered trademark) or infrared communication.

Configuration of HMD Apparatus

Figure 3:
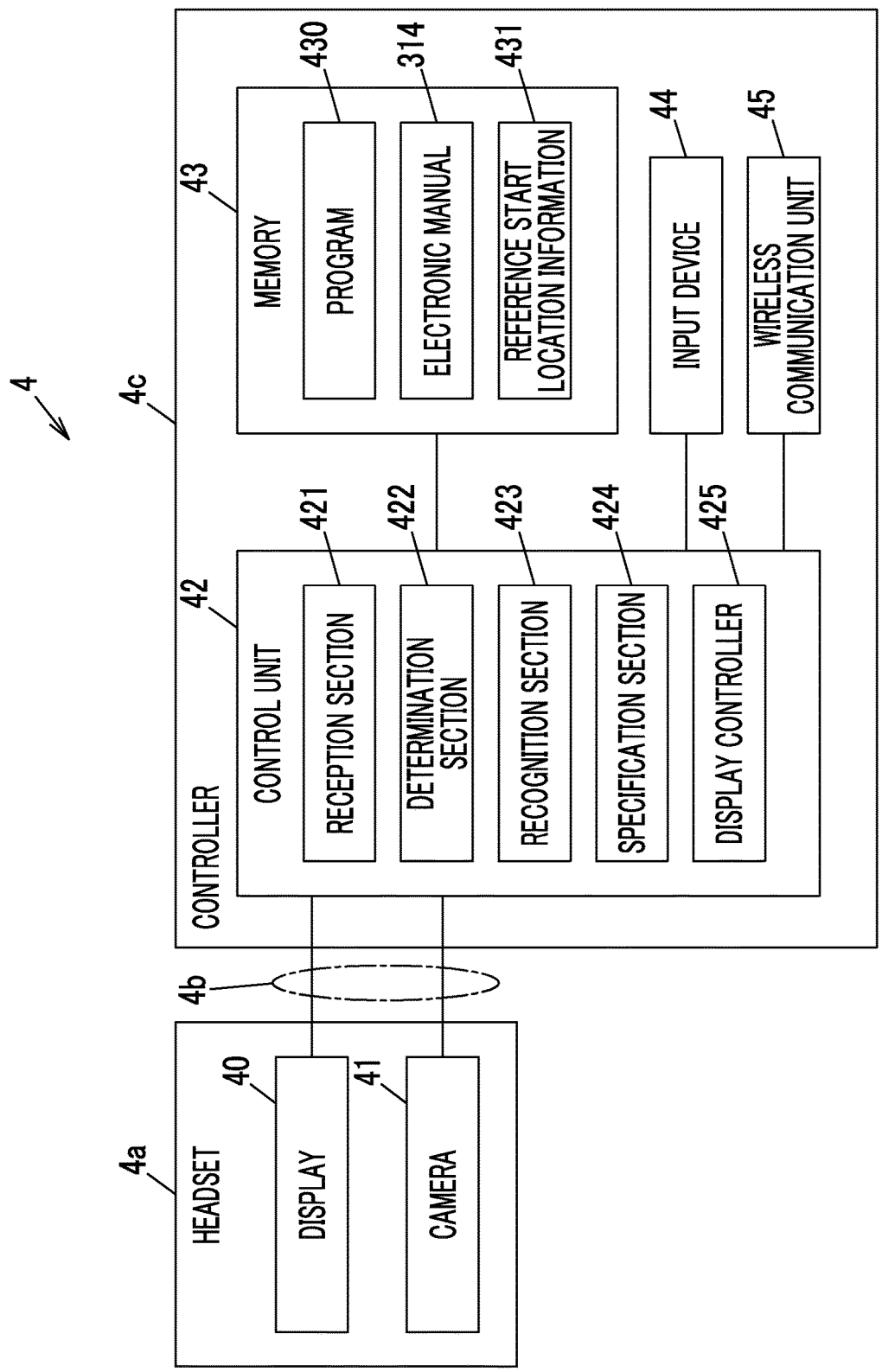
FIG. 3 is a diagram illustrating an example of a control system of a Head Mounted Display (HMD) apparatus.

FIG. 3 is a diagram illustrating an example of a control system of the HMD apparatus 4. The HMD apparatus 4 includes a head-mounted unit 4a and a controller 4c which is connected to the head-mounted unit 4a through a cable 4b. Meanwhile, the controller 4c may be provided in a frame which is included in the head-mounted unit 4a.

The head-mounted unit 4a includes a glasses-type frame which is mounted on the head of the user, right and left lenses which are attached to the frame and through which visible light passes, a display 40 which is provided in the frame, and a camera 41 which is provided at a center of the frame and which captures a forward outside view. The lenses are examples of the display.

The HMD apparatus 4 includes the display 40 and the camera 41 which are provided in the head-mounted unit 4a, and a control unit 42, a memory 43, an input device 44, and a wireless communication unit 45 which are provided in the controller 4c.

The display 40 includes a liquid crystal display as a light emission source which emits image light, and may be a type in which the image light is projected as the virtual image (false image) onto the outside view or a type in which the image light is directly formed and projected onto retinas of the user.

The camera 41 captures the outside view and transmits a captured image to the control unit 42 of the controller 4c via the cable 4b. An image captured by the camera 41 may be a moving image or plural still images which are captured during a second.

The control unit 42 includes a Central Processing Unit (CPU), an interface, or the like. The CPU operates according to a program 430 stored in the memory 43, and functions as a reception section 421, a determination section 422, a recognition section 423, a specification section 424, a display controller 425, or the like. Details of each of the sections 421 to 425 will be described later. The determination section 422 is an example of the acquisition section.

The memory 43 includes a Read Only Memory (ROM), a Random Access Memory (RAM), and the like, and stores the program 430, the electronic manual 314, reference start location information 431, the information (for example, the user ID) of the user, and the like.

The electronic manual 314 is acquired from the image forming apparatus 3. The reference start location information 431 includes a page number which indicates the page of the reference destination that is determined by a determination section 433 which will be described later, a spot of the reference destination, a ranking of the page of the reference destination, and the like.

It is possible to use, for example, an input section, such as a keyboard or a touch panel display, as the input device 44. The input device 44 is connected to the control unit 42 in a wired or wireless manner. Meanwhile, the operation display 32, which is provided in the image forming apparatus 3 as the input device 44, may be used. In addition, keywords, various requests, and the like may be input through voice input.

The wireless communication unit 45 communicates with the image forming apparatus 3, for example, using a wireless LAN, such as Wi-Fi or Wi-Fi direct, or short-range wireless communication such as Bluetooth or infrared communication.

The reception section 421 receives the keywords, the various requests, and the like which are input by operating the input device 44. In addition, in a case where communication is established between the image forming apparatus 3 and the HMD apparatus 4, the reception section 421 receives the pieces of apparatus information (the basic apparatus information 311, the apparatus state information 312, and the history information 313), the electronic manual 314, the electronic manual reference information 315, and the like from the image forming apparatus 3.

In addition, in a case where the process performed in the image forming apparatus 3 stops due to the error, the reception section 421 receives the error code according to the cause of the error. Furthermore, in a case where the process performed in the image forming apparatus 3 restarts, the reception section 421 receives information which indicates the restart.

The determination section 422 determines the page number which indicates the page of the reference destination of the book 2 and the spot of the reference destination of the page based on the user ID, the pieces of apparatus information (the basic apparatus information 311, the apparatus state information 312, and the history information 313), the electronic manual reference information 315, the input keywords, and the like. The page of the reference destination is a page in which reference should be started. The spot of the reference destination is a spot in which reference should be started. Hereinafter, the page in which reference should be started or the spot of the reference destination is referred to as a "reference start location". In a case where plural pages of the reference destination are determined, the determination section 422 determines rankings of the pages of the reference destination. The page number is an example of the page information. Ranking information, which indicates a ranking, may be a number or the like. The determination section 422 stores the page number which indicates the determined page of the reference destination, the spot of the reference destination, and the ranking information in the memory 43 as reference start location information 431.

In a case where the page of the reference destination is determined, the determination section 422 may determine, for example, a page which includes the keyword as the page of the reference destination. In addition, in a case where the apparatus state information 312, which is received by the reception section 421 from the image forming apparatus 3, includes the error code or in a case where the reception section 421 receives the error code, the determination section 422 may determine a page, in which the cause of the error or the coping method is written, as the page of the reference destination or the spot of the reference destination based on the error code. It is possible to acquire the determined page number and the spot of the reference destination from the electronic manual 314.

For example, the following method is considered as a method for determining the ranking.

(a) The ranking may be determined using the number of times being referred to in the same model in a descending order based on the model of the image forming apparatus 3 which is included in the basic apparatus information 311. It is possible to acquire the ranking from the electronic manual reference information 315.

(b) An immediately preceding operation may be extracted from the operation history included in the history information 313 and the ranking may be determined using the number of times of operations which are performed subsequent to the operation. For example, a case where it is desired to refer to the manual for the operation subsequent to the immediately preceding operation performed by the user is taken into consideration. It is possible to acquire the ranking from the operation history included in the history information 313.

(c) The ranking may be determined using the number of times being referred to by the user in the past in a descending order. It is possible to acquire the ranking from the electronic manual reference information 315.

The recognition section 423 recognizes a location and a posture of the book 2 from the image captured by the camera 41, and, furthermore, recognizes the fore edge. The recognition section 423 recognizes the page number which indicates an open page of the book 2. The details will be described later.

The specification section 424 specifies a location, which corresponds to the page number determined by the determination section 422, on the fore edge of the book 2. In a case where plural page numbers determined by the determination section 422 exist, the specification section 424 specifies plural locations.

As a method for specifying the location, which corresponds to the page of the reference destination, on the fore edge, the specification section 424 recognizes a thickness of the fore edge in the image based on, for example, the location of the fore edge recognized by the recognition section 423, acquires a total number of pages from the electronic manual 314, and specifies the location, which corresponds to the page of the reference destination, on the fore edge in the image from the thickness of the fore edge and the total number of pages.

The display controller 425 performs control such that an instruction image indicative of a location, which is specified by the specification section 424, on the fore edge is superimposedly displayed on the fore edge which is seen through the display provided in the HMD apparatus 4 that is mounted on the user, that is, to be virtually displayed. Furthermore, in a case where the open page is correct, that is, in a case of the page of the reference destination, the display controller 425 performs control such that an instruction image indicative of the spot of the reference destination is superimposedly displayed on the page. Here, the display controller 425 performs control such that the instruction image, which is superimposedly displayed on the fore edge, is not displayed. The spot of the reference destination is not limited to be located on the top of the page. Therefore, the spot of the reference destination of the page is not limited and is, for example, preferably shown using the instruction image after the page of the reference destination is opened from the viewpoint of searching time is reduced. Meanwhile, in a case where the spot of the reference destination is located on the top of the page, the display controller 425 may perform control such that an instruction image indicative of the top of the open page is superimposedly displayed on the page.

In addition, in a case where the reception section 421 receives the error code from the image forming apparatus 3, the display controller 425 performs control such that an instruction image indicative of the page, which corresponds to the error code, of the reference destination of the book 2 is superimposedly displayed on the fore edge of the book 2. In addition, in a case where the reception section 421 receives information, which indicates that the process that is stopped in the image forming apparatus 3 is restarted, the display controller 425 performs control such that the instruction image is not displayed.

In addition, in a case where the page, which is opened by the user, is different from the page of the reference destination, the display controller 425 performs control such that the instruction image indicative of the location, which is specified by the specification section 424, on the fore edge or indicative of a direction of the location is superimposedly displayed on the fore edge which is seen through the display provided in the HMD apparatus 4 that is mounted on the user.

In addition, the display controller 425 performs control such that the instruction image indicative of the page of the reference destination or the page of the reference destination relevant to an operation subsequent to an operation corresponding to the spot of the reference destination is superimposedly displayed on the fore edge which is seen through the display provided in the HMD apparatus 4 which is mounted on the user. It is possible to acquire the page of the reference destination or the page of the reference destination relevant to an operation subsequent to the spot of the reference destination from, for example, the item number which is written with the title in the electronic manual 314. For example, in a case where the item number is "3.1.1", the title is "change of setting content", a subsequent item number is "3.1.2", the title is "establishment of setting content", and an operation, which is currently performed, is "change of setting content", it is understood that a subsequent operation is "establishment of setting content" based on the item number.

Furthermore, in a case where the open page of the book 2 is different from the page of the reference destination relevant to the subsequent operation, the display controller 425 performs control such that the instruction image indicative of the page corresponding to the subsequent operation is highlighted and superimposedly displayed on the book. For example, a conspicuous color or a large letter may be used as a highlighting and superimposedly displaying method.

Method for Recognizing Book

The recognition section 423 may use the following method as a method for recognizing the location and the posture of the book 2 in the image (also referred to as a captured image) captured by the camera 41. For example, in cases where a feature value of the reference image relevant to a cover, a back cover, and height of the book 2 is stored in the memory 43 in advance, a feature value of the book 2 is extracted from the captured image acquired by the camera 41, and a degree of similarity between the extracted feature value and the feature value of the reference image, which is stored in the memory 43, satisfies a predetermined value, a target object included in the captured image is recognized as the book 2, and the location and the posture of the book 2 in the captured image are recognized.

As another method for recognizing the location and the posture of the book 2, for example, a recognition code indicative of a location is formed in a predetermined location (for example, the cover, the back cover, the height, the fore edge, or the like) of the book 2 through printing or the like, the recognition code is recognized from the image, and thus the location and the posture of the book 2 may be recognized in the captured image. For example, a QR code (registered trademark) or the like may be taken into consideration as the recognition code. Meanwhile, the recognition code may be any image from which a feature point is extracted in advance. In addition, the recognition code may be provided in each of or any one of the cover, the back cover, the height, and the fore edge of the book 2. In a case where the recognition code is provided in each surface or a major surface of the book 2, it is possible to more accurately recognize the location and the posture of the book 2, compared to a case where the recognition code is not provided.

Method for Recognizing Fore Edge

Figure 4A:
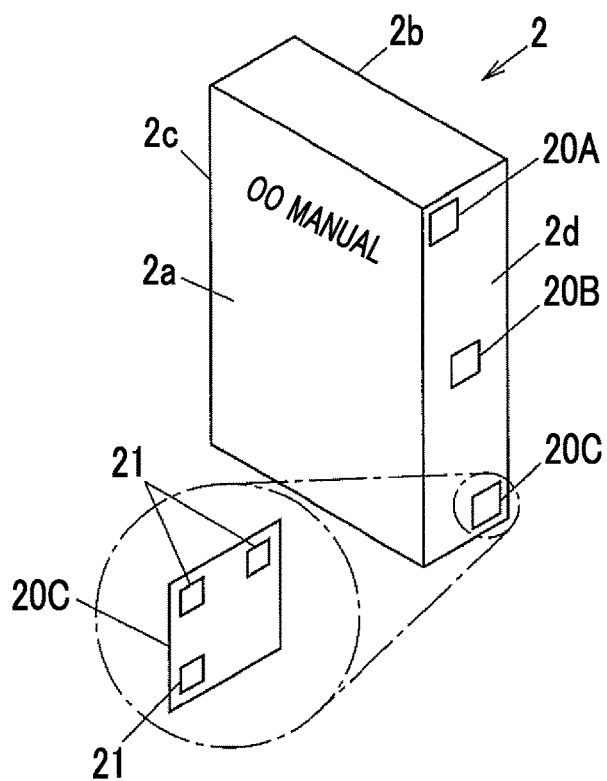
FIGS. 4A to 4D are perspective diagrams of a book used to describe a method for recognizing a location and a posture of a fore edge.

FIGS. 4A to 4D are perspective diagrams illustrating the book 2 in order to describe a method for recognizing a location and a posture of the fore edge. FIG. 4A is a perspective diagram illustrating an example of the book 2. The book 2 includes a cover 2a, a back cover 2b, a height 2c, and a fore edge 2d. As illustrated in FIG. 4A, in the fore edge 2d, three first to third recognition codes 20A, 20B, and 20C (in a case where the recognition codes are generally called, referred to as a "recognition code 20") are formed through printing or the like. The three recognition codes 20A to 20C have the same pattern. That is, the recognition code 20 has location detection patterns 21, for example, at three corners, that is, upper left, upper right, and lower left. Meanwhile, the recognition code 20 may have patterns, such as a book ID used to identify the book 2 and location information indicative of a location where the recognition code is provided, in addition to the location detection patterns 21.

Figures 4B, 4C, 4D:
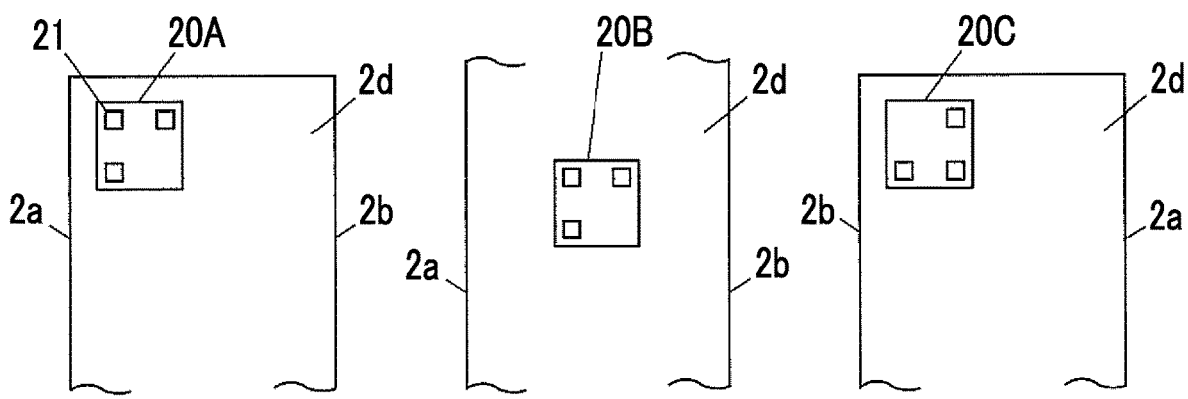

In a case where the location of the location detection pattern 21 is recognized, it is possible to recognize an orientation of the book 2, and thus it is possible to recognize a direction in which the cover 2a is provided, that is, a side of a first page. In a case where plural recognition codes 20 are formed in the fore edge 2d, it is possible to recognize a location and an orientation of the fore edge 2d even in a case a part of the book 2 is missed and it is not possible to capture the whole book 2. For example, in a case where only the first recognition code 20A is captured among the three recognition codes 20 as illustrated in FIG. 4B, in a case where only the second recognition code 20B is captured as illustrated in FIG. 4C, and in a case where only the third recognition code 20C is captured as illustrated in FIG. 4D, it is possible to recognize the fore edge 2d based on an arrangement of the three location detection patterns 21, and thus it is possible to recognize a direction in which the cover 2a is provided. In a case of FIG. 4D, the book 2 is turned upside down, and thus it is understood that the three location detection patterns 21 are disposed upside down with respect to the location detection patterns 21 illustrated in FIG. 4A and a right side of the fore edge 2d becomes the cover 2a.

Method for Recognizing Page

The recognition section 423 may recognize the page number by, for example, forming a code image, in which the page number is encoded, in each page of the book 2 through printing or the like and by reading the code image from the captured image. The recognition section 423 recognizes the page number by reading encoded information from the code image and decoding the read information. Meanwhile, instead of the code image, written content may be recognized, and the page number may be recognized by performing comparison with an electronic document, which includes document information, for each page. In addition, a page number, which is printed at a lower part or an upper part of each page, may be recognized.

Example of Display on Fore Edge

Images illustrated in FIGS. 5A to 5C and FIGS. 6A and 6B, which will be described later, may be used as instruction images 10a to 10e (in a case where the instruction images are generally called, referred to as an "instruction image 10") indicative of a location, which corresponds to the page of the reference destination, on the fore edge.

Figure 5A:
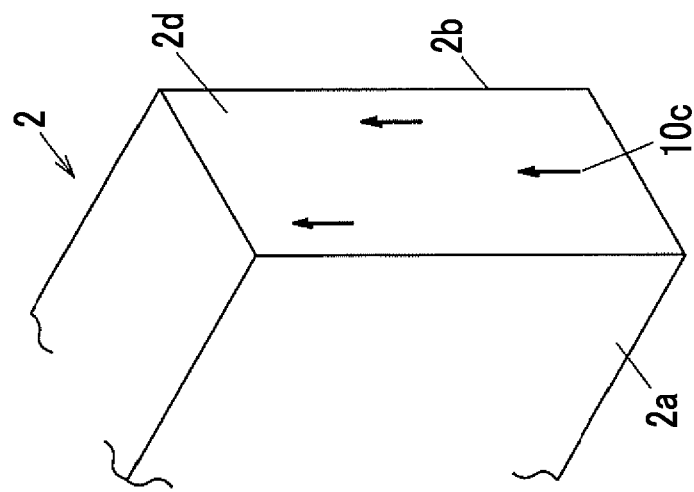
FIGS. 5A to 5C are diagrams illustrating an example of an instruction image indicative of a location on the fore edge corresponding to a page of a reference destination.
Figure 5B:
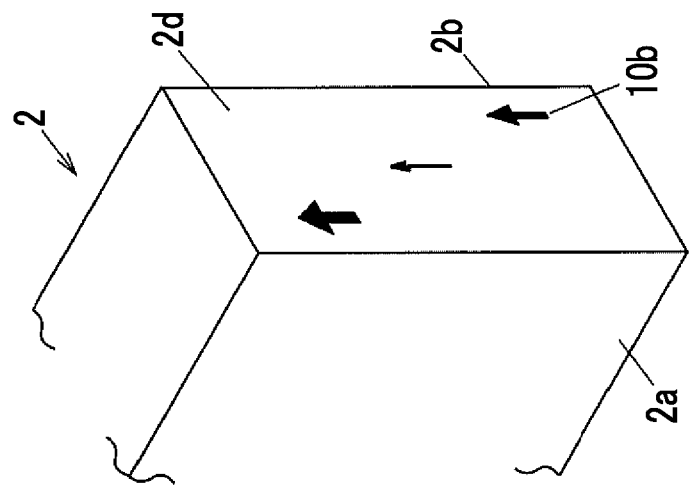
Figure 5C:
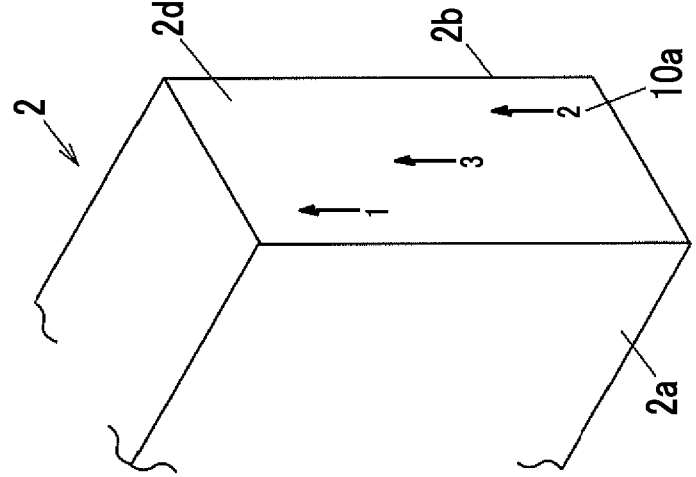

FIGS. 5A to 5C are diagrams illustrating examples of the instruction image indicative of the location, which corresponds to the page of the reference destination, on the fore edge. An instruction image 10a illustrated in FIG. 5A is acquired by combining an arrow indicative of a location and a number indicative of a ranking. An instruction image 10b illustrated in FIG. 5B shows a ranking using a thickness of an arrow indicative of a location. In this case, the thickest arrow corresponds to a first ranking. An instruction image 10c illustrated in FIG. 5C shows a ranking using a location of the arrow indicative of the location in a height direction. In this case, an arrow at the highest location corresponds to the first ranking.

Figure 6A:
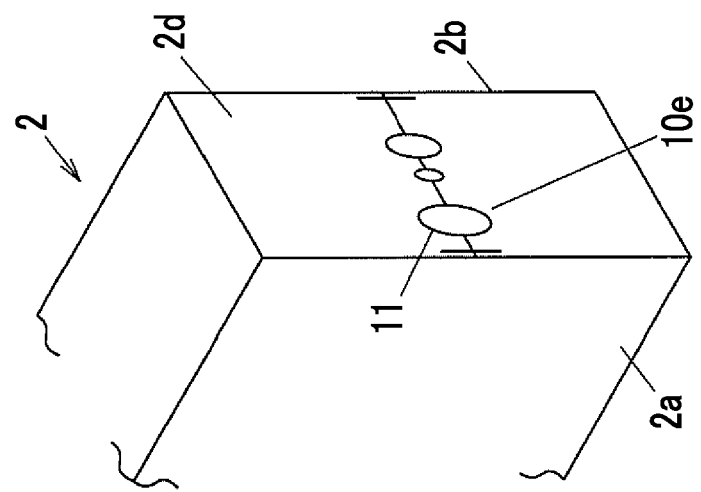
FIGS. 6A and 6B are diagrams illustrating another example of the instruction image indicative of the location, which corresponds to the page of the reference destination, on the fore edge.
Figure 6B:
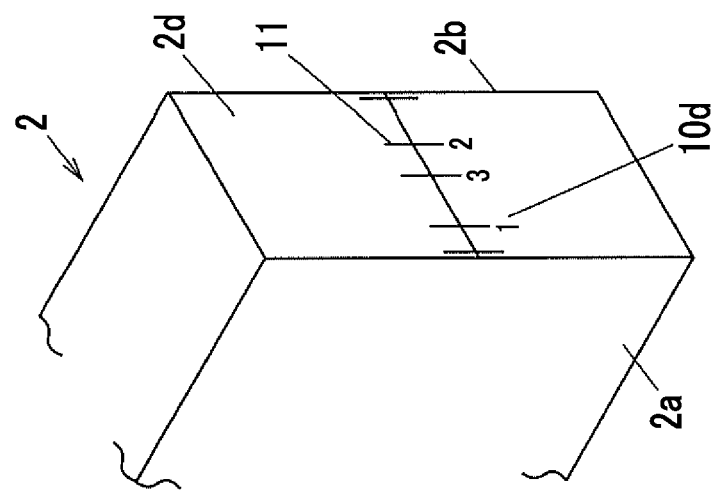

FIGS. 6A and 6B are diagrams illustrating another example of the instruction image indicative of the location, which corresponds to the page of the reference destination, on the fore edge. An instruction image 10d illustrated in FIG. 6A shows a location using a gradation 11 of a gauge and shows the ranking using a number. An instruction image 10e illustrated in FIG. 6B shows a location using the gradation 11 of the gauge, and shows the ranking using a size of the gradation 11.

Example of Display in Case Where Wrong Page is Opened

Images illustrated in FIGS. 7A to 7E may be used as instruction images 12a to 12e (in a case where the instruction images are generally called, referred to as an "instruction image 12") indicative of a direction of a correct page in a case where a wrong page is opened.

Figure 7A:
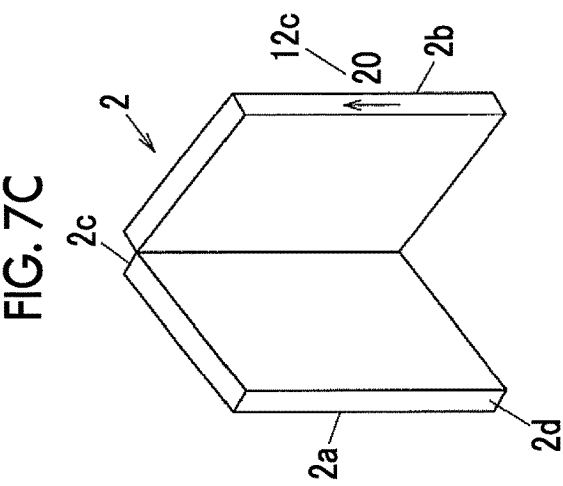
FIGS. 7A to 7E are diagrams illustrating an example of the instruction image in a case where a wrong page is opened.
Figure 7B:
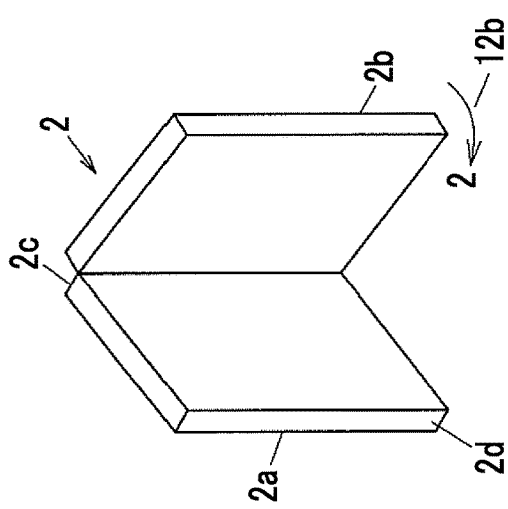
Figure 7C:
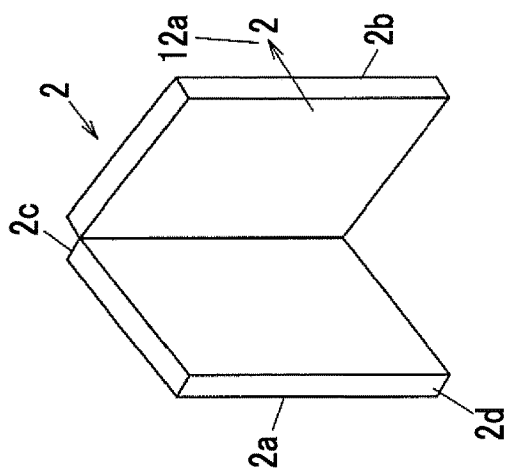
Figure 7D:
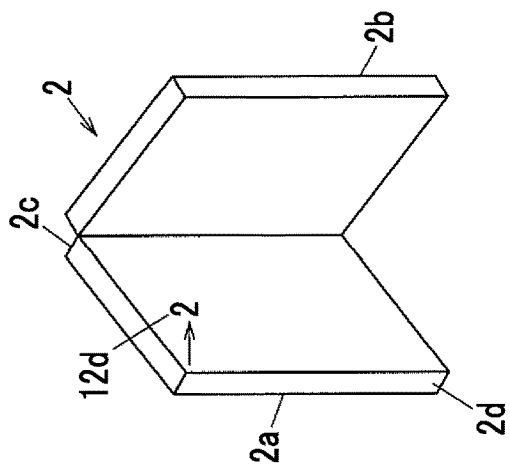
Figure 7E:
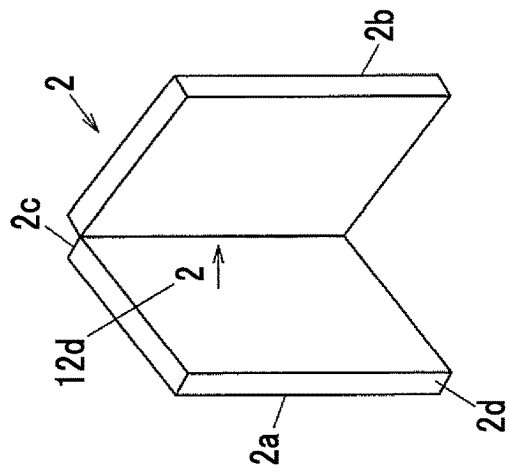

FIGS. 7A to 7E are diagrams illustrating examples of the instruction images used in a case where the wrong page is opened. In the instruction image 12a illustrated in FIG. 7A, an arrow indicates a direction of the page of the reference destination and a number indicates the number of sheets to be open. In the instruction image 12b illustrated in FIG. 7B, an arrow indicates an open operation and a number indicates the number of sheets to be open. In the instruction image 12c illustrated in FIG. 7C, an arrow indicates a location of the reference destination again and a number indicates the number of sheets to be open in a case where the page of the reference destination is deviated largely. The instruction image 12d illustrated in FIGS. 7D and 7E is acquired by displaying the arrow and the number, which are illustrated in FIG. 7A, are displayed in the page. Meanwhile, a correct location may be displayed on the fore edge 2d. In addition, another figure may be used instead of the arrow. Furthermore, the ranking may be indicated by a size of another figure instead of a size of the arrow.

Operation of Exemplary Embodiment

Subsequently, an example of an operation of the display system 1 will be described. FIG. 8 is a flowchart illustrating an example of an operation of the HMD apparatus 4. FIG. 9 is a flowchart illustrating an example of an image recognition process in FIG. 8. Meanwhile, a flow of the image recognition process is not limited to FIG. 9.

In a case where the user inputs a keyword by operating the input device 44 of the HMD apparatus 4 and requests to display a page, which is relevant to the keyword, of the electronic manual 314, the reception section 421 of the HMD apparatus 4 receives the keyword and the request for the display of the page of the electronic manual 314 (S1). Meanwhile, the request for the display of the page of the electronic manual 314 may be performed without inputting the keyword.

Subsequently, the determination section 422 acquires the user ID of the user who uses the HMD apparatus 4 from the memory 43, communicates with the image forming apparatus 3, receives the basic apparatus information 311, the apparatus state information 312, and the history information 313 as apparatus information from the image forming apparatus 3, and receives the electronic manual 314 and the electronic manual reference information 315 (S2).

The determination section 422 determines the reference start location of the book 2 (the page number of the page of the reference destination and the spot of the reference destination in the page of the reference destination) and the ranking of the page of the reference destination based on the received information (S3). For example, in a case where three pages of the reference destinations are determined, the rankings of the reference destinations are determined with respect to the where three pages.

The recognition section 423 starts the image recognition process for recognizing a display target included in the image captured by the camera 41 (S4).

Subsequently, the image recognition process will be described with reference to FIG. 9. The recognition section 423 determines whether or not the book 2 is recognized in the image which is transmitted from the camera 41 to the control unit 42 (S401). Ina case where the book 2 is recognized (S401: Yes), it is determined whether or not the fore edge 2d is recognized in the image (S402).

In a case where the fore edge is recognized (S402: Yes), the specification section 424 specifies plural (for example, three) reference start locations. The display controller 425 controls the display 40 to virtually display the instruction image (refer to FIGS. 5A to 5C and FIGS. 6A and 6B) indicative of the reference start location and the ranking on the fore edge 2d (S403). It is possible for the user to search the book for the page corresponding to the operation intended by the user in a case where the page is opened while the instruction image is used as a marker, and it is possible to reduce time which is taken for search, compared to a case where the search is performed based on a list page.

The recognition section 423 determines whether or not the page, which is opened by the user, is correct based on the image captured by the camera 41 (S404). In a case where the open page corresponds to the reference start location, it is determined to be a correct page.

In a case where the page, which is opened by the user, is not correct (S404: No), the display controller 425 controls the display 40 to virtually display the instruction image 12, which indicates a direction of the correct page, as illustrated in FIGS. 7A to 7E (S405).

In a case where a correct page is opened (S404: Yes), the display controller 425 controls the display 40 to virtually display an instruction image (not shown in the drawing) indicative of the reference start location in the page (S406).

The recognition section 423 determines whether or not it is possible to recognize the page in the image which is transmitted from the camera 41 to the control unit 42 (S407). A case where the user performs a work or an operation while closing the manual is considered as the above-described case.

In a case where it is not possible to recognize the page (S407: No), the display controller 425 stores the page which is opened so far. The display controller 425 controls the display 40 to virtually display, for example, an illustration (not shown in the drawing), which is used as information included in the page, as minimum information which is necessary for the operation of the user (S408). The minimum information is information which is extracted from an original page. In a case where information to be displayed is set as the minimum information, it is easy to recognize the content of the page, compared to a case where the content of the page is displayed as it is. Meanwhile, the minimum information may be another piece of information such as a title or a point.

The recognition section 423 determines whether or not the book 2 is recognized in the image which is transmitted from the camera 41 to the control unit 42 (S409). In a case where the book 2 is recognized (S409: Yes), it is determined whether or not the fore edge 2d is recognized in the image (S410).

In a case where the fore edge is recognized (S410: Yes), the display controller 425 controls the display 40 to virtually display the instruction image indicative of the reference start location corresponding to the page that is opened last time in the fore edge 2d (S411).

The recognition section 423 determines whether or not the open page is the page, which is opened last time, based on the image captured by the camera 41 (S412).

In a case where the open page is not the page which is opened last time (S412: No), the display controller 425 controls the display 40 to virtually display the instruction image 12 indicative of a direction of the correct page, as illustrated in FIGS. 7A to 7E (S413).

In a case where the open page is the page which is opened last time (S412: Yes), the display controller 425 controls the display 40 to virtually display the instruction image indicative of the spot of the reference destination in the page (S414).

First Modified Example

Control may be performed such that the instruction image indicative of the location of the page, which is relevant to the information displayed on a display screen of the operation display 32 of the image forming apparatus 3, of the book 2 is superimposedly displayed on the fore edge 2d of the book 2 by the display controller 425. Specifically, the reception section 421 receives information which is displayed on the display screen of the operation display 32 of the image forming apparatus 3. The determination section 422 acquires the page number indicative the page of the reference destination, which corresponds to the information received by the reception section 421, of the book 2. The specification section 424 specifies the location, which corresponds to the page number acquired by the determination section 422, on the fore edge. The display controller 425 performs control such that the instruction image indicative of the specified location on the fore edge is superimposedly displayed on the fore edge 2d which is seen through the display provided in the HMD apparatus 4 that is mounted on the user.

Second Modified Example

The page of the reference destination may be constricted by taking past reference history of the user into consideration. In a case where reference history of a same page is read as many as a predetermined number of times, it is possible to omit the page, and thus it is possible to specify the reference start location except the page.

Third Modified Example

Information may be written in the page of the reference destination of the electronic manual. For example, the HMD apparatus 4 is caused to have a function of detecting a gesture of the user based on the image captured by the camera, and thus a mark may be applied to a significant spot in the page, which is opened by the user, according to the gesture. In a case where the same page is opened, it is possible to superimposedly display the mark on the page. Meanwhile, the information may be written using the input device 44.

Fourth Modified Example

The book 2 may be a book having white paper and, in a case where the book 2 is opened, content of a page corresponding to the electronic manual may be superimposedly displayed on the open page. Therefore, for example, the manual is revised using only the electronic manual.

Fifth Modified Example

In the exemplary embodiment, the determination section 422 of the HMD apparatus 4 determines the page of the reference destination, the ranking, and the like. However, the image forming apparatus 3 or the external apparatus may determine the page of the reference destination, the ranking, and the like, and the HMD apparatus 4 may acquire the determined page, the ranking, and the like. Therefore, it is possible to reduce loads of a process, which is relevant to the determination, of the HMD apparatus 4.

Hereinabove, the exemplary embodiment of the present invention is described. The exemplary embodiment of the present invention is not limited to the exemplary embodiment, and various modifications and implementations are possible without departing from the gist of the present invention.

A part or the entirety of the sections of the control unit 30 or 42 may include a hardware circuit such as a Field Programmable Gate Array (FPGA) or an Application Specific Integrated Circuit (ASIC).

In addition, it is possible to omit or change a part of the components of the exemplary embodiment without changing the gist of the present invention. In addition, it is possible to perform addition, deletion, change, replacement, and the like on a flow of the exemplary embodiment without changing the gist of the present invention. In addition, it is possible to provide the program used in the exemplary embodiment by recording the program in a computer-readable recording medium such as a CD-ROM. In addition, it is possible to store the program used in the exemplary embodiment in an external server, such as a cloud server, and to use the program via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display apparatus comprising:
a processor, configured to:
acquire page information indicative of a page of a reference destination of a book;
specify a location, which corresponds to the acquired page information, on a fore edge of the book; and
perform control such that an image indicative of the specified location on the fore edge is superimposedly displayed on the fore edge which is seen through a camera provided in the display apparatus that is mounted on a user.

2. The display apparatus according to claim 1,
wherein the processor is further configured to receive error information according to a cause of stopping in a case where a process performed in another apparatus stops,
wherein the processor acquires the page information indicative of a page, in which the cause of stopping or a coping method is written, based on the error information.

3. The display apparatus according to claim 2,
wherein the processor performs control such that the image is not displayed in a case where the processor receives information which indicates that the process performed in another apparatus restarts.

4. The display apparatus according to claim 1,
wherein the processor is further configured to recognize the page information indicative of the open page of the book,
wherein the processor acquires a spot of the reference destination together with the page information, and performs control such that an image indicative of the spot of the reference destination is superimposedly displayed on the page recognized.

5. The display apparatus according to claim 4,
wherein the processor performs control such that an image indicative of the page of the reference destination relevant to an operation to be performed subsequent to an operation corresponding to the spot of the reference destination is superimposedly displayed on the fore edge.

6. The display apparatus according to claim 5,
wherein an image indicative of a page corresponding to the subsequent operation is highlighted and superimposedly displayed in a case where the open page of the book is different from the page of the reference destination relevant to the subsequent operation to be performed.

7. The display apparatus according to claim 4,
wherein the display controller processor performs control such that the image indicative of the page of the reference destination is not displayed in a case where the recognized page information is identical to the acquired page information.

8. The display apparatus according to claim 2,
wherein the processor is further configured to recognize the page information indicative of the open page of the book,
wherein the processor acquires a spot of the reference destination together with the page information, and
performs control such that an image indicative of the spot of the reference destination is superimposedly displayed on the page recognized.

9. The display apparatus according to claim 8,
wherein the processor performs control such that an image indicative of the page of the reference destination relevant to an operation to be performed subsequent to an operation corresponding to the spot of the reference destination is superimposedly displayed on the fore edge.

10. The display apparatus according to claim 9,
wherein an image indicative of a page corresponding to the subsequent operation is highlighted and superimposedly displayed in a case where the open page of the book is different from the page of the reference destination relevant to the subsequent operation to be performed.

11. The display apparatus according to claim 1,
wherein the processor is further configured to recognize page information indicative of an open page of the book,
wherein the processor performs control such that an image indicative of a spot of the reference destination of the open page is superimposedly displayed in a case where the recognized page information is identical to the acquired page information.

12. The display apparatus according to claim 1,
wherein the processor acquires a plurality of pieces of page information indicative of a plurality of pages of the reference destinations and ranking information indicative of rankings of the reference destinations of the plurality of pages,
specifies a plurality of the locations, which correspond to the plurality of pieces of page information, on the fore edge of the book, and
performs control such that the images indicative of the plurality of specified locations on the fore edge and the rankings are superimposedly displayed on the fore edge.

13. A display apparatus comprising:
a processor, configured to:
acquire page information indicative of a page of a reference destination of a book;
recognize page information indicative of an open page of the book; and
perform control such that an image indicative of the page of the reference destination is superimposedly displayed on the book which is seen through a camera provided in the display apparatus that is mounted on a user in a case where the recognized page information is different from the acquired page information.

14. The display apparatus according to claim 13,
wherein the processor is further configured to receive error information according to a cause of stopping in a case where a process performed in another apparatus stops,
wherein the processor acquires the page information indicative of a page, in which the cause of stopping or a coping method is written, based on the error information.

15. The display apparatus according to claim 14,
wherein the processor performs control such that the image is not displayed in a case where the processor receives information which indicates that the process performed in another apparatus restarts.

16. The display apparatus according to claim 14,
wherein the processor is further configured to recognize the page information indicative of the open page of the book,
wherein the processor acquires a spot of the reference destination together with the page information, and
performs control such that an image indicative of the spot of the reference destination is superimposedly displayed on the page recognized.

17. The display apparatus according to claim 16,
wherein the processor performs control such that an image indicative of the page of the reference destination relevant to an operation to be performed subsequent to an operation corresponding to the spot of the reference destination is superimposedly displayed on the fore edge.

18. The display apparatus according to claim 17,
wherein an image indicative of a page corresponding to the subsequent operation is highlighted and superimposedly displayed in a case where the open page of the book is different from the page of the reference destination relevant to the subsequent operation to be performed.

19. A display apparatus comprising:
a processor, configured to:
receive information which is displayed on a display screen of another apparatus;
acquire page information indicative of a page, which corresponds to the received information, of a reference destination of a book;
specify a location, which corresponds to the acquired page information, on a fore edge of the book; and
perform control such that an image indicative of the specified location on the fore edge is superimposedly displayed on the fore edge which is seen through a camera provided in the display apparatus that is mounted on a user.

20. The display apparatus according to claim 19,
wherein the processor is further configured to recognize the page information indicative of an open page of the book,
wherein the processor acquires a spot of the reference destination together with the page information, and
performs control such that an image indicative of the spot of the reference destination is superimposedly displayed on the page recognized.

* * * * *